350-319
SEARCH ROO
T350-319
X 3750
X 250-
X 250-

Jan. 24, 1967 P. W. CAULIER ETAL 3,299,771

SHUTTER FOR PINHOLE DETECTORS

Filed May 17, 1963 2 Sheets-Sheet 1

INVENTORS
PAUL W. CAULIER
CORBIN DIXON
BY James G. Williams
ATTORNEY

SHUTTER FOR PINHOLE DETECTORS

Filed May 17, 1963 2 Sheets-Sheet 2

INVENTORS
PAUL W. CAULIER
CORBIN DIXON
BY James J. Williams
ATTORNEY

United States Patent Office 3,299,771
Patented Jan. 24, 1967

3,299,771
SHUTTER FOR PINHOLE DETECTORS
Paul W. Caulier and Corbin Dixon, Waynesboro, Va., assignors to General Electric Company, a corporation of New York
Filed May 17, 1963, Ser. No. 281,305
4 Claims. (Cl. 88—14)

The invention relates to an improved shutter for pinhole detectors.

During some point in the manufacture or utilization of metallic strip material, the strip material is inspected for small holes. These small holes, usually called pinholes, may exist in the thickness dimension of the material. The apparatus for inspecting and detecting the pinholes utilizes a light source and a light sensitive device which are positioned on opposite sides of the path of travel of the strip material. As long as the strip material is free from pinholes, no light from the source reaches the light sensitive device. However, when a pinhole in the strip material passes between the light source and light sensitive device, light from the source can reach the light sensitive device. The light sensitive device responds and provides a signal that indicates a pinhole has been detected. Some appropriate action, such as marking or noting the pinhole, may be initiated in response to the signal. In order that stray light be prevented from reaching the light sensitive device by a path other than through a pinhole, and thereby cause a false indication, the light sensitive device is usually enclosed in a chamber having only a narrow slot for admitting light. In addition, shutters are provided at each of the two opposite side edges of the strip material to totally or to partially reduce stray light which would otherwise reach the light sensitive device by traveling around the side edges of the strip material. However, the use of such shutters has presented problems. If the shutters overlap the strip material by a sufficient amount to reduce stray light, then the overlapped portions of the strip material are not inspected. Such portions which are not inspected have to be removed, and are wasted. If the shutters overlap less strip material to provide inspection of a greater area, the amount of stray light which may reach the light sensitive device increases, and may reach the point where it provides an inoperable condition or results in false indications. If the shutters use a pliable or resilient material to engage the strip material and reduce stray light, the pliable or resilient material is subject to wear and may damage the strip material.

Accordingly, an object of the invention is to provide an improved shutter for pinhole detectors.

Another object of the invention is to provide an improved shutter for pinhole detectors which prevents substantially any undesirable amount of stray light from passing around the edges of the strip material to be inspected.

Another object of the invention is to provide an improved shutter for pinhole detectors which permits a greater area of strip material to be inspected but which prevents stray light from reaching the light sensitive device without touching the strip material.

These and other objects of the invention are achieved by a shutter which has an upper plate and a lower plate which form a throat through which the edge of the material passes. Each of the plates has a slit therethrough that extends away from the strip material. One or more vanes extend across each slit. The vanes preferably lie in planes which are substantially perpendicular to the throat and which intersect the material. A light trap in the form of a chamber may be provided for either or both of the upper and lower plates. These chambers open into the throat. Light may shine through the upper slit onto the material, and reach substantially all of the material. The arrangement of the vanes and light traps, however, prevents the light from shining or passing around the edge of the material.

The invention is particularly pointed out in the claims. The invention may be better understood from the following description given in connection with the accompanying drawing, in which:

Figure 1:
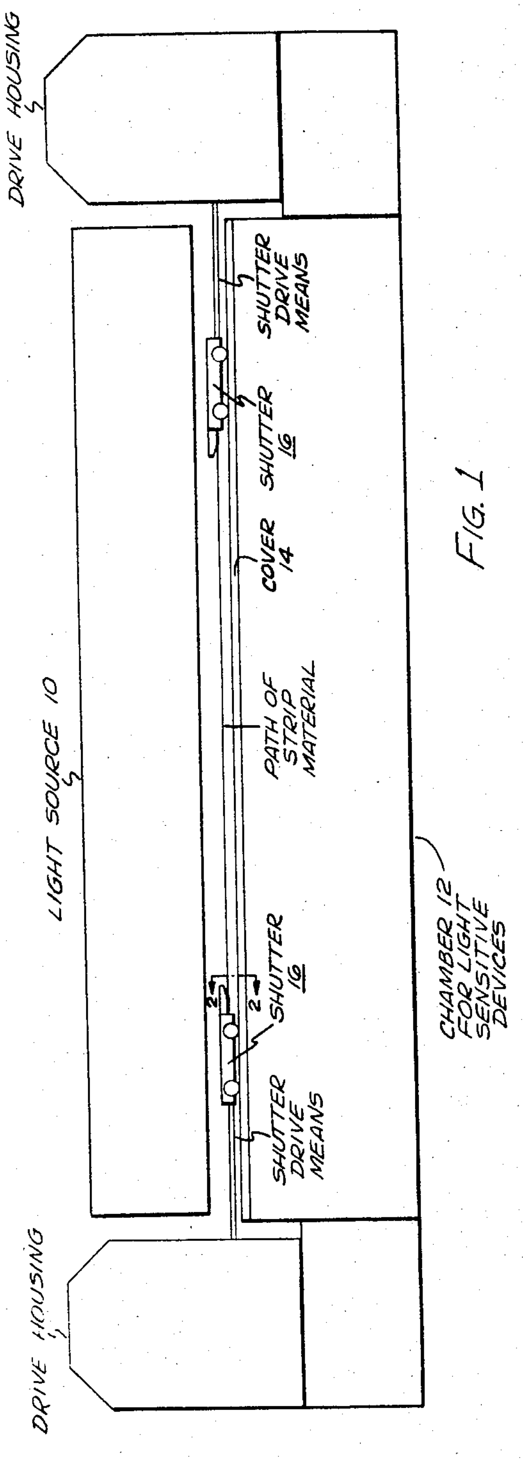
FIGURE 1 shows a pinhole detector utilizing the improved shutters of the invention, the view of FIGURE 1 being end-on with respect to the path of strip material.

The pinhole detector shown in FIGURE 1 has been positioned or oriented so that it is viewed with the strip material moving in a path perpendicular to the plane of FIGURE 1. The strip material usually inspected by such a pinhole detector may be hundreds or thousands of feet in length, several feet in width, and less than an inch in thickness. Therefore the strip material passes through the pinhole detector by moving along its length so that the pinhole detector must be able to accommodate the width and thickness of the strip material. The pinholes to be detected exist through the thickness of the strip material. This strip material follows a path between a light source 10 and an enclosed chamber 12 which houses one or more light sensitive devices. The light source 10 may comprise any suitable source of light that preferably extends the full length of the chamber 12 and that shines down on the chamber 12 and the strip material. The length of the light light source 10 and the chamber 12 is sufficient to accommodate the widest piece of strip material to be inspected. The chamber 12 is provided with a top cover 14 which extends longitudinally along the length of the chamber 12. A longitudinal slot is placed in the cover, this cover slot being arranged or positioned so that its length is substantially transverse to the path or direction of travel of the strip material. The chamber 12 is provided with one or more light sensitive devices which, on receipt of light from the source 10, provide an output signal. Normally, with the strip material passing along its path between the light source 10 and the chamber 12, no light reaches the light sensitive devices. However, if a flaw or pinhole is present in the strip material, a small amount of light passes through this pinhole and through the slot in the cover 14 of the chamber to reach the light sensitive devices. When the light sensitive devices receive some amount of light, they provide a signal which can be utilized in any desired way to indicate the presence of a pinhole or flaw in the strip material. The light source 10 and the chamber 12 with its light sensitive devices as thus far described are known in the art. An explanation and discussion of such a light source and chamber are given in Patent No. 2,947,876 granted August 2, 1960 to J. J. Larew. Two movable shutters 16 are positioned on either side of the path of the strip material, that is, on or at the side edges of the strip material. These shutters 16 can move along the cover 14 of the chamber 12. The shutters 16 are positioned relative to the side edges of the strip material to permit the maximum amount of light to shine down on the strip material and thereby be inspected. The shutters 16 may be moved or positioned relative to the side edges of the strip material by suitable drive means which are indicated in the drawing. A preferred drive means utilizes the servo-controlled arrangement described in Patent No. 2,981,845 granted April 25, 1961, to J. J. Larew et al.

Figure 2:
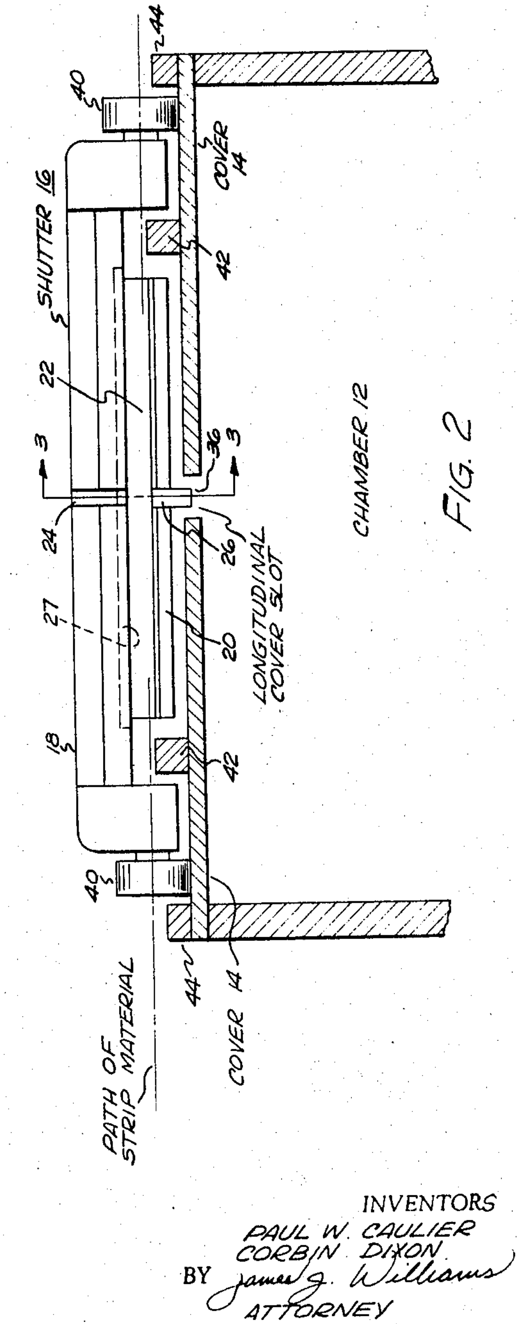
FIGURE 2 shows an enlarged view of a shutter in accordance with the invention and a cross-sectional view of a portion of the pinhole detector, taken along the lines 2—2 in FIGURE 1.
Figure 3:
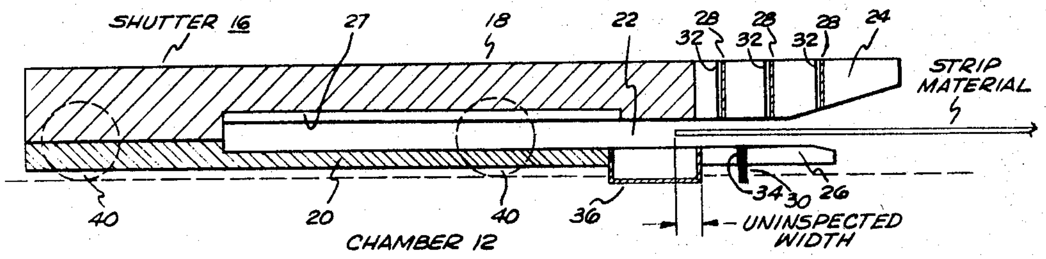
FIGURE 3 shows a cross-sectional view of the shutter taken along the lines 3—3 in FIGURE 2.
Figure 4:
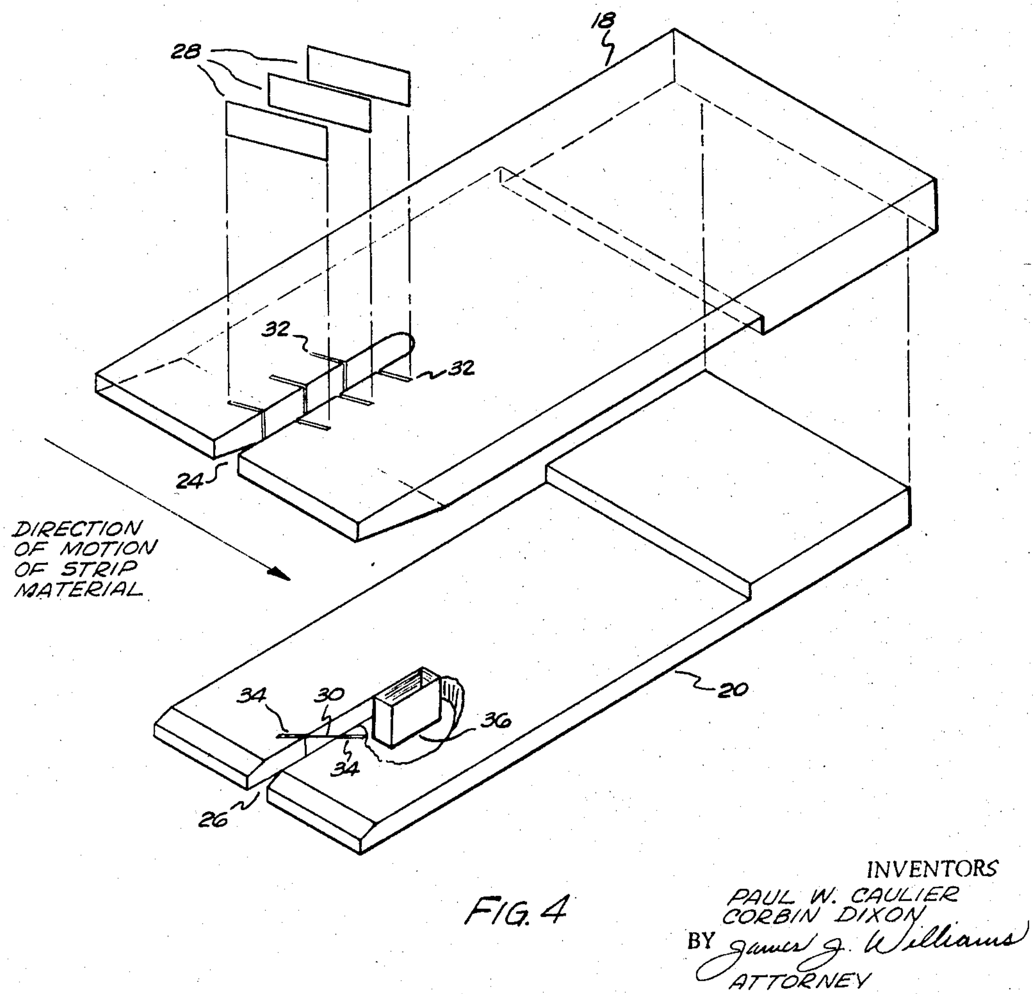
FIGURE 4 shows an exploded perspective view of the shutter in accordance with the invention.

A shutter in accordance with the invention, and which may be used in the pinhole detector shown in FIGURE 1, is shown in FIGURES 2, 3, and 4. FIGURE 2 shows the shutter and a cross-sectional view of a portion of the pinhole detector taken along the lines 2—2 in FIGURE 1. FIGURE 3 shows a cross-sectional view of the shutter taken along the lines 3—3 in FIGURE 2. And FIGURE 4 shows an exploded perspective view of the shutter. The following description of the shutter is with reference to FIGURES 2, 3, and 4. The shutter 16 includes an upper rectangular plate 18 and a lower rectangular plate 20 made of suitable material such as brass. The plates 18, 20 are shaped and joined at one end to form an opening or throat 22 through which the strip material may pass as it moves along a substantially plane path. The throat 22 is made sufficiently deep to accommodate abrupt changes or projections in the width of the strip material. The upper plate 18 is provide with an elongated opening or slit 24 that extends from the throat end of the plate 18 toward the joined end. The lower plate 20 is also provided with an elongated opening or slit 26 that extends from the throat end of the plate 20 toward the joined end. The throat end of the upper plate 18 extends farther over the strip material than the throat end of the lower plate 20. The slits 24, 26 are positioned in their respective plates 18, 20 so as to extend in the same direction. When viewed from above the plates 18, 20, the slits 24, 26 extend perpendicularly from the direction of motion of the strip material and are at least partially in register. Light from the source may shine through the part of the slits 24, 26 in register in the absence of an opaque object.

The upper plate 18 is provided with suitable kerfs 32 at the slit 24 for receiving one or more thin plates or vanes 28. Similarly, the lower plate 20 is provided with suitable kerfs 34 at the slit 26 for receiving one or more thin plates or vanes 30. The vanes 28, 30 may be flush with the surfaces of the plates 18, 20 or, if dimensions permit, may project beyond the surfaces. In FIGURE 3, the vane 30 is shown as projecting below the lower surface of the lower plate 20. The vanes 28, 30 are omitted from FIGURE 2 for clarity. In FIGURE 4, the vanes 28 are shown removed from their kerfs 32 in the upper plate 18, and the vane 30 is in position in its kerf 34 in the lower plate 20. The kerfs 32, 34 are positioned or oriented in their respective plates 18, 20 so that the positioned vanes 28, 30 lie in a plane which is substantially perpendicular to the plane of the throat 22 or the strip material and which preferably intersects with the direction of motion of the strip material at a suitable angle, for example 45 degrees. In other words, the vanes 28, 30 are preferably positioned at an angle greater than zero degrees with respect to the direction of motion of the strip material for reasons which will be explained. This direction of motion is usually a straight line.

The lower surface of the upper plate 18 may be recessed to form a cavity 27 in the rear portion (i.e., back from the slit 24) of the throat 22. A chamber 36 of suitable shape, such as rectangular, is positioned in the slit 26 in the lower plate 20, and extends below the lower surface of the lower plate 20. The chamber 36 is closed on its four vertical sides and on its bottom to form a light-tight structure. The throat end of the chamber 36 is substantially in register with the bottom of the slit 24 in the upper plate 18. The chamber 36 opens at its upper side into the throat 22. The upper side of the chamber 36 is flush with the upper surface of the lower plate 20. This is shown in detail in the broken away portion of FIGURE 4.

It is preferable that all surfaces of the plates 18, 20, the throat 22, the slits 24, 26, the vanes 28, 30, the cavity 27, and the chamber 36 be painted or coated with a dull black surface to absorb and reduce reflected light.

The shutter 16 is mounted on suitable wheels or rollers 40 so that it can move along the cover 14 between inner and outer guides 42, 44. This can be seen in FIGURE 2. FIGURE 2 also shows the relationship of the shutter 16 to the cover 14 and to the longitudinal slot in the cover 14. It will be seen that the chamber 36 may actually extend slightly down into the longtiudinal slot in the cover 14. Light from the light source 10 shining down on the upper plate 18 passes through the slit 24 and strikes the strip material. The shutter of the invention insures that only light from the source which passes through a pinhole in the strip material may pass through the longitudinal slot into the chamber 12. As indicated in FIGURE 3, the uninspected width of the strip material is relatively small. Light from other directions, such as from the right at acute angles relative to the plane of the strip material (as viewed in FIGURE 3), strikes the vanes 28, 30, the inner surfaces of the chamber 36, the surfaces of the throat 22, and the cavity 27 which attenuate substantially all such light. Therefore, substantially no light is reflected down into the longitudinal cover slot.

The shutter shown in FIGURES 2, 3, and 4 is a preferred arrangement. It has been found that with such an arrangement, namely three vanes 28 in the slit 24 of the upper plate 18, one vane 30 in the slit 26 in the lower plate 20, and the chamber 36, the uninspected width of strip material may be as low as 0.10 inch and pinholes of 0.0005 inch diameter can still be detected. The arrangement further permits a narrower longitudinal slot to be used so that the pinholes can be located more precisely in the length of the strip material. However, other arrangements or modifications may be made. For example, more or less vanes may be used, and a chamber may be provided for the slit 24 in the upper plate 18. But it is very desirable that the vanes be substantially perpendicular to the plane of the strip material and preferably intersect the direction of motion of the strip material at some angle, but not necessarily the same angle or 45 degrees. In other words, the vanes preferably should not be parallel to the direction of motion of the strip material. This is to insure that all of the strip material is exposed to the inspecting light as the material moves. The vanes may be parallel to each other or may be at any angle with respect to each other. Vanes may also be placed in the longitudinal cover slot to absorb additional light. And vanes may be placed in the housing of the light source to reduce side rays of light. However, such modifications will be apparent to persons skilled in the art. Therefore, while the invention has been described with reference to a particular embodiment, it is to be understood that modifications may be made without departing from the spirit of the invention or from the scope of the claims.

What we claim as new and desire to secure by Letters Patent of the United States is:

1. In apparatus for inspecting strip material that moves along a path, improved shutters for preventing stray light from passing around the edges of said material, each shutter comprising an upper plate and a lower plate arranged to form a substantially U-shaped throat for receiving an edge of said material in said path at the corresponding open ends of said plates, said upper and lower plates having respective slits therethrough that extend in from said open ends in the same direction, at least one light obstructing vane extending across said slit in said upper plate, at least one light obstructing vane extending across said slit in said light obstructing lower plate, said vanes lying in planes which are substantially perpendicular to said throat, and a light trap formed of a chamber fastened to one of said plates at the surface away from said throat, said chamber opening into said throat for trapping stray light.

2. In apparatus for inspecting strip material that moves along a substantially plane path, improved shutters for preventing stray light from passing around the edges of said material, each shutter comprising an upper plate and a lower plate arranged to form a substantially U-shaped throat for receiving an edge of said material in said path at the corresponding open ends of said plates so that said material may move between said open ends of said plates, said upper and lower plates having respective slits therethrough positioned in the vicinity of said throat and extending in the same direction from said open ends, at least one light obstructing vane extending across said slit in said upper plate, at least one light obstructing vane extending across said slit in said lower plate, said light obstructing vanes lying in planes which are substantially perpendicular to the plane of said path and which form an angle greater than zero relative to said path, and a light trap formed of a light-tight chamber fastened to one of said plates, said chamber being positioned partially in the slit in the plate to which it is fastened extending from said throat to partially beyond said last mentioned plate, and being open at said throat for trapping stray light.

3. In apparatus for inspecting strip material as it moves along a substantially plane path in a substantially straight line between a source of light and a chamber containing a light sensitive device, improved shutters positioned at edges of said material along said path for preventing stray light from passing around said edges, each shutter comprising an upper plate and a lower plate arranged to form a substantially U-shaped throat open at one end thereof and through which an edge of said material will pass as it moves along said path, said upper and lower plates having respective elongated openings in the vicinity of said throat, said openings extending in a direction away from said one end of said plates and at least a portion of said openings being in register, at least one light obstructing vane positioned in the opening in said upper plate, at least one light obstructing vane positioned in the opening in said lower plate, said light obstructing vanes lying in planes which are substantially perpendicular to the plane of said path, and a light trap formed of a closed chamber and partially positioned in the opening in one of said plates, said chamber opening into a portion of said throat for trapping stray light.

4. In apparatus for inspecting strip material as it moves along a substantially plane path in a substantially straight line between a source of light and a chamber containing a light sensitive device, improved shutters positioned at opposite edges of said material along said path for preventing stray light from passing around said edges, each shutter comprising an upper plate and a lower plate arranged to form a throat open at one end thereof through which an edge of said material will pass as it moves along said path, said upper and lower plates having respective elongated openings in the vicinity of said throat, said openings extending in a direction away from said one end of said plates in a direction substantially perpendicular to said straight line, at least a portion of said openings being in register, at least one light obstructing vane positioned in the opening in said upper plate, at least one light obstructing vane positioned in the opening in said lower plate, said light obstructing vanes lying in planes which are substantially perpendicular to the plane of said path and which preferably form an angle greater than zero degrees with respect to said straight line, and a light trap formed of a closed chamber fastened to said lower plate, said chamber comprising walls which are positioned in said opening in said lower plate and positioned below said lower plate away from said throat, said chamber opening into a portion of said throat trapping stray light.

References Cited by the Applicant

UNITED STATES PATENTS 2,979,984 4/1961 Rosen.

JEWELL H. PEDERSEN, *Primary Examiner.*

RONALD L. WIBERT, *Examiner.*